United States Patent
Chen et al.

(10) Patent No.: US 12,122,865 B2
(45) Date of Patent: Oct. 22, 2024

(54) EMULSION POLYMER COMPOSITIONS AND USE THEREOF IN LOW ODOR WATERPROOFING COATINGS

(71) Applicants: Arkema France, Colombes (FR); Arkema Inc., King of Prussia, PA (US)

(72) Inventors: Haiming Chen, Changshu Jiangsu (CN); Wenjun Wu, King of Prussia, PA (US); Xiangling Meng, Changshu Jiangsu (CN); Leo Mario Saija, Bagnolo in Piano (IT); Mario Lugli, Fabbrico (IT); Hua Zhou, Changshu Jiangsu (CN)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 18/398,317

(22) Filed: Dec. 28, 2023

(65) Prior Publication Data

US 2024/0124636 A1  Apr. 18, 2024

Related U.S. Application Data

(62) Division of application No. 16/766,005, filed as application No. PCT/CN2017/112269 on Nov. 22, 2017, now abandoned.

(51) Int. Cl.
| | |
|---|---|
| C08F 222/02 | (2006.01) |
| C04B 41/48 | (2006.01) |
| C08F 2/26 | (2006.01) |
| C08F 2/30 | (2006.01) |
| C08F 212/08 | (2006.01) |
| C08F 220/06 | (2006.01) |
| C08F 220/18 | (2006.01) |
| C08F 220/20 | (2006.01) |
| C08F 220/38 | (2006.01) |
| C08F 220/56 | (2006.01) |
| C08F 222/06 | (2006.01) |
| C08F 230/02 | (2006.01) |
| C08F 236/02 | (2006.01) |
| C08K 3/013 | (2018.01) |
| C08K 3/26 | (2006.01) |
| C08K 3/36 | (2006.01) |
| C08K 5/36 | (2006.01) |

(52) U.S. Cl.
CPC .......... *C08F 230/02* (2013.01); *C04B 41/483* (2013.01); *C08F 2/26* (2013.01); *C08F 2/30* (2013.01); *C08F 212/08* (2013.01); *C08F 220/06* (2013.01); *C08F 220/1804* (2020.02); *C08F 220/20* (2013.01); *C08F 220/382* (2020.02); *C08F 220/56* (2013.01); *C08F 222/02* (2013.01); *C08F 222/06* (2013.01); *C08F 236/02* (2013.01); *C08K 3/013* (2018.01); *C08K 3/26* (2013.01); *C08K 3/36* (2013.01); *C08K 5/36* (2013.01); *C08F 220/1808* (2020.02); *C08F 2800/20* (2013.01); *C08F 2810/40* (2013.01); *C08K 2003/262* (2013.01)

(58) Field of Classification Search
CPC .............. C08F 230/02; C08F 220/1804; C08F 220/382; C08F 2/26; C08F 2/30; C08F 212/08; C08F 220/06; C08F 220/20; C08F 220/56; C08F 222/02; C08F 222/06; C08F 236/02; C08F 220/1808; C08F 2800/20; C08F 2810/40; C08K 3/26; C08K 3/36; C08K 5/36; C08K 2003/262; C08K 3/013; C04B 41/483
USPC .......................................................... 524/556
See application file for complete search history.

(56) References Cited

U.S. PATENT DOCUMENTS

| | | | |
|---|---|---|---|
| 2013/0143023 A1* | 6/2013 | Herold ...................... | C04B 2/02 428/220 |
| 2013/0183448 A1* | 7/2013 | Herold .................... | C04B 24/06 524/5 |
| 2019/0144585 A1* | 5/2019 | Rost ...................... | C08F 212/08 526/80 |
| 2019/0241762 A1* | 8/2019 | Willerich ........... | C09D 151/003 |

* cited by examiner

*Primary Examiner* — Kelechi C Egwim
(74) *Attorney, Agent, or Firm* — Debodhonyaa Sengupta

(57) ABSTRACT

The invention relates to aqueous polymer dispersions comprising polymerized units issued from the following monomers with related weight proportions based on 100 parts of weight of a)+b): a) 50 to 90% of a monoethylenically unsaturated non-ionic monomer, b) 10 to 50% of vinyl aromatic monomer or methyl methacrylate, c) 1 to 5% of a hydroxy-containing (meth)acrylate, d) 0.1 to 3% of acid monomer selected from d1) acid monomer selected from monocarboxylic or dicarboxylic acid monomers and d2) acid monomer selected from phosphorous-based or sulfur-based strong acid monomers or/and their salts, or from the mixtures of d1) and d2), e) 0.001 to 0.5% of chain transfer agent, and f) 0 to 1% one of internal crosslinker bearing at least two copolymerisable ethylenic unsaturations, the polymer having a Tg measured by DSC from −30 to 0° C. and a gel content of 0 to 60%, formed during polymerization.

18 Claims, No Drawings

EMULSION POLYMER COMPOSITIONS AND USE THEREOF IN LOW ODOR WATERPROOFING COATINGS

This application is a divisional of U.S. Ser. No. 16/766,005 filed May 21, 2020, which is a national stage application under 35 U.S.C. § 371 of PCT/CN2017/112269, filed Nov. 22, 2017.

TECHNICAL FIELD

The present invention relates to aqueous dispersions for use in two-component waterproofing cementitious coatings, having low VOC, low odor with an ammonia emission less than 50 ppm, preferably not higher than 30 ppm, a method of preparation thereof, a two-component waterproofing coating composition comprising besides said dispersion a cement powder, uses in the field of cementitious waterproofing coatings and the resulting final product (waterproofing coating) with a high balance of applicative performances.

BACKGROUND ART

U.S. Pat. No. 6,617,387 claims ammonia-free polymer dispersion containing a) from 40 to 80% by weight of C2-C12 ester of acrylic acid; b) from 10 to 40% by weight of vinyl aromatic monomer and/or C1-C4 ester of methacrylic acid; c) from 2 to 15% by weight of C2-C10 alkanediol with acrylic acid or methacrylic acid, d) not more than 1% by weight of ethylenically unsaturated monomers which have at least one acid group, or salts thereof; e) less than 5% by weight of ethylenically unsaturated nitriles and f) less than 1% by weight of amides of ethylenically unsaturated mono- and dicarboxylic acids. The said polymer dispersion is used as powder granule additives for building materials based on hydraulic binders. Because of the inclusion of the unsaturated amide monomer which is the source of volatile ammonia release upon mixing with cement due to hydrolysis of amide group under strong alkali condition, the emulsion polymer described in U.S. Pat. No. 6,617,387 will likely not meet the building industry standard JC1066-2008.

WO 2016/001256 discloses a dispersion of (meth)acrylate copolymer containing a hydroxyalkyl (meth)acrylate comonomer unit, which is obtained from polymerization of monomers comprising, a) from 25 to 45% by weight of at least one monovinyl aromatic monomer and/or methyl methacrylate; b) from 50 to 70% of at least one C4-C8 alkyl (meth)acrylate; c) from 2 to 7% by weight of one hydroxyalkyl (meth)acrylate; d) from 0 to 1% by weight of one monoethylenically unsaturated C3-C6 mono- and dicarboxylic acid; and e) from 0 to 0.65% by weight of (meth)acrylamide, N-hydroxyalkyl (meth)acrylamide, and/or 2-acrylamido-2-methylpropane sulfonic acid, and use thereof for flexible cementitious waterproofing materials. WO 2016/001256 is completely silent about the relationship between gel content of the emulsion polymer (no control of gel content) and the mechanical properties of resulting waterproofing coatings and how to optimize the coating performance using any particular composition design strategy.

CN 105254802 discloses a waterproofing emulsion polymer and method of making it. The emulsion polymer comprises: 100 part DI water, 60~90 part acrylate (BA, 2EHA, EA, HEA, HPA), 10~40 part styrene, 0.1~2 part acrylic acid functional monomer (including AA, MAA, IA), 1~3 part anionic and nonionic mixed emulsifier (anionic: C10-C20 alkyl sulfate, alkylbenzene sulfonate or sulfosuccinate and nonionic: fatty alcohol ethoxylate or alkyl alcohol ethoxylate) system at ratio from 1:4 to 4:1; 0.3~2.5 part initiator (APS, NaPS, KPS), 0.1~0.5 part buffer (NaHCO$_3$, Na$_2$CO$_3$); 0.1~2 part hydrosiloxane stabilizer, 0.1~0.5 oxidizer (tBHP) and 0.05~0.25 part reducer (ascorbic acid, sodium bisulfite, sodium metabisulfite). In CN 105254802 the presence of a hydrosiloxane stabilizer is necessary. It is suggested in CN 105254802 that the formation of organic-inorganic interpenetrating network with the cement powder during film formation allows for good waterproofing and mechanical properties resulting from a tighter film. None controlled level of gel content is disclosed in CN 105254802 as a way to achieve specific waterproofing performances and mechanical properties.

CN 106749875 claims a low odor, self-crosslinking acrylic emulsion and method of making it. The emulsion polymer comprises: 100 part water, 60~90 part acrylate (EA, BA, 2EHA, HEA), 30~60 part styrene, 0.5~2 part acrylamide functional monomer, 0.1~3 part acrylic acid functional monomer (AA, MAA, IA), 1~10 part anionic and nonionic mixed emulsifier system at ratio of from 1:4 to 4:1; 0.3~9 part initiator (APS, NaPS, KPS); 0.01~0.1 part pH adjusting agent (Na$_2$CO$_3$, NaHCO$_3$, CaAc$_2$, NaAc); 0.1~0.5 part oxidizer (H$_2$O$_2$, tBHP); 0.05~0.2 part reducer (L-ascorbic acid, sodium bisulfite, sodium metabisulfite). Acrylamide is an essential functional monomer required in CN 106749875 and as such it can be a source of emission of free ammonia and low odor could not be achieved. No measurement data is provided in CN 106749875 to substantiate the low ammonia claim. In the claimed usage range of 0.5 to 2 part acrylamide, CN 106749875 will likely not meet the building industry standard JC1066-2008.

US2017/0226013 claims two-component compositions comprising A) acrylic emulsion having Tg of from −40 to 0° C., and comprising the residue reducing agent, and B) a fast curing dry mix powder composition of a hydraulic cement and a high alumina content cement, wherein the aqueous emulsion copolymer is the copolymerization product of i) from 60 to 89.9 wt % nonionic (meth)acrylic monomers; ii) from 10 to 40 wt % of vinyl aromatic monomers, and iii) from 0.1 to 2.0 wt % of monomers chosen from itaconic acid, methacrylic acid, amides of unsaturated C3-C6 carboxylic acids, and mixtures thereof. It further comprises the copolymerization product of iv) 0.1 to 1.5 wt % hydroxylalkyl (meth)acrylate. None 2$^{nd}$ acid monomer having lower pKa, chain transfer agent and ethylenically multi-unsaturated crosslinking monomer is in US2017/0226013.

CN 101891859 discloses a polymeric cementitious waterproofing coating using elastomeric styrene acrylic emulsion. The claimed emulsion polymer comprise 0.1~0.5% ethoxylated C12-C18 fatty alcohol sulfate (9EO & 15EO); 0.1~0.5% ethoxylated C12-C18 fatty alcohol (meth)acrylate (9EO & 15EO); 30~40% BA; 10~20% Styrene; 0.1~1% AMPS and 0~10% N-methylolacrylamide; 29~60% DI water. N-methylol acrylamide claimed by CN 1 01 891 859 is a potential source of free ammonia and of free formaldehyde during drying/curing and as such they are not suitable environmentally friendly waterproofing coatings.

CN 102911580 claims a crosslinkable waterproofing acrylic emulsion comprising 35~40% BA, 10~15% Styrene, N-methylolacrylamide; 1.0~1.5% diacetone acrylamide (DAAM); 1~3% emulsifier; 0.2~0.5% persulfate salt; 0.05~0.08% adipic dihydrazide (ADH); 0.3% defoamer; 40~50% water and neutralent for pH adjustment to 6.5~7.5. Since N-methylolacrylamide containing compositions produce formaldehyde and volatile ammonia during drying and curing, then the disclosed dispersions are not suitable for environmentally friendly waterproofing coatings.

CN 105949381 discloses a no ammonia waterproofing emulsion and method of making low ammonia waterproofing coating. The ammonia-free waterproofing emulsion comprises: 40~50 part water; 0.6~12.0 part emulsifier including 0.1~2 part nonionic surfactant and 0.5~10 part reactive surfactant; 0.02~20 part phosphate monomer; 0.05~40 part hydrophilic monomer (AA, MAA, HEA, HEMA, HPA, HPMA, BMA, DAAM, 1130A, etc); 0.05~60 part hydrophobic monomer (Sty, MMA, BA, isooctyl acrylate, hexyl acrylate); 0.05~20 part polymerizable stabilizer; 0.02~5 part vinylsilane; 0.02~5 part initiator; 0.02~5 part chain transfer agent; 0.02~5 part buffer, 0.02~5 part defoamer; 0.02~5 part base. The polymerizable stabilizer is selected from 2-acrylamido-2-methylpropanesulfonic acid, sodium vinyl sulfonate, sodium methyl allylsulfonate, sodium allylsulfonate, sodium allyloxyhydroxysulfonate, 2-acrylamido-2-methylpropyl sulfonate. CN 105949381 requires reactive emulsifier or vinylsilane and none chain transfer agent and none ethylenically multi-unsaturated crosslinking monomer is specified in CN 105949381.

U.S. Pat. No. 8,193,278 discloses an aqueous caulk or sealant composition that is substantially free of any plasticizer, comprising an aqueous binder of one or more copolymers chosen from i) 0.1 to 5 wt % based on total monomer weight mixed backbone acid copolymer copolymerized from methacrylic acid (MAA) and a second acid monomer having a lower pKa than MAA and chosen from a mono-carboxylic acid, dicarboxylic acid, phosphorous acid, sulfur acid, and mixtures thereof, ii) a copolymer having a mixture of backbone acid and hydroxyl groups copolymerized from 0.5 to 7.5 wt %, based on total copolymerized monomer weight, of one or more hydroxyl group containing monomer and from 1.0 to 5.0 wt. %, based on total copolymerized monomer weight, of one or more acidic monomer chosen from MAA and the second acid monomer; and copolymer mixtures thereof; wherein the copolymer has a Tg of −25° C. or lower. No chain transfer agent or ethylenically multi-unsaturated crosslinking monomer is specified in U.S. Pat. No. 8,193,278. The present invention is searching to find an emulsion polymer (aqueous dispersion) suitable for use in two-component cementitious waterproofing coating compositions comprising the said emulsion polymer, which are environmentally friendly and exhibit improved workability, mechanical and waterproofing properties with a good balance of applicative performances. More particularly the aqueous dispersion of the present invention is related with the following performances:
 have a low odor with less than 50 ppm of ammonia emitted, which is environmentally friendly in waterproofing applications according to JC 1066-2008,
 has a gel content in the range of 0 to 60% and preferably lower than 55%
 enable cementitious waterproofing coatings prepared from the said coating composition to have tensile strength, elongation, bonding strength which can meet and exceed JC 1066-2008 standard,
 enable a good workability of the two-component cementitious waterproofing coating.

Polymer modified waterproofing coating need to have good tensile strength, adhesion, water impermeability, cracking resistance and durability. Emulsion polymers used in conventional two-component waterproofing coatings generally contain acrylamide type functional monomer to achieve the desired balance of tensile and elongation properties. However, the strong alkali condition causes the amide group to hydrolyze and release odorous and irritating ammonia, upon mixing with cement. The coating then becomes brittle and easy to cracking after hydrolysis of acrylamide, loses its tensile strength, elongation and water impermeability. Low- or non-ammonia waterproofing coatings prepared from polymer composition free of acrylamide function monomer suffer from poor mechanical properties. The problem, which the inventors were seeking to solve, is to make a certain emulsion polymer that meets <50 ppm volatile ammonia according to JC 1066-2008 without compromising workability and mechanical properties when used in polymeric cementitious waterproofing coatings.

In water-proofing coating market, traditional application with two-component cementitious formulation (liquid part and powder part) is not friendly to operator because of odor generated by latex, water, and cement component(s).

When coming to nowadays, "green" and environmental friendliness is more and more emphasized. Big customers/key customers are switching to GREEN grade, or willing to switch. The potential market volume is huge. We solve the problem in order to meet market needs. Competitor may provide low odor product, but the performance may be 20% lower than traditional product, with advantage of low odor. The present invention uses optimized formula and process, and reach good balance of performance.

SUMMARY OF THE INVENTION

The present invention faces firstly the general problem of the prior art solutions vs low odor which consists in that:
 Traditional latex for 2 k water-proofing membrane or mortar application has a problem of odor.
 Latex itself is not well designed or manufactured, thus it can cause smell issue.
 When latex mixes with cement and water, the mixture can generate free-ammonia and it leads to uncomfortable odor.
 Free-ammonia can be originated by (a) N-substituted group from polymer chain, which forms ammonium hydroxide after hydrolysis or/and by (b) hydrolysis of an N-substituted group beared by other components than polymer, like additives, surfactants, etc. and from (c) ammonium solution used as neutralizing agent.

The present invention proposes a new specific aqueous polymer dispersion and process having a low odor related with emitted free ammonia of both the latex itself and during processing or coating manufacturing and at the same time a very good balance of applicative performances in cementitious waterproofing two component coatings, in particular a good balance between flexibility (% of elongation) and tensile strength of the waterproofing final coating, while having good workability of the cementitious formulation before application. The latex (aqueous polymer dispersion) according to the present invention with its specific selection of composition, enables a final cementitious waterproof coating having effectively good applicative performances, mechanical strength, water-resistance, besides being environmentally friendly with very low odor of the latex itself and very low odor during processing or paint manufacturing and application. In particular said water-proofing cementitious coating has low odor with less than 50 ppm, preferably not more than 35 ppm, of free ammonia, has an elongation of at least 75%, preferably of at least 125%, a tensile strength of at least 1.3 MPa, preferably of at least 2 MPa and a bonding strength of at least 0.7 MPa, preferably of at least 0.9 MPa.

A first main subject matter of the invention relates to an aqueous polymer dispersion with said polymer being issued from a specific monomeric composition comprising a) a monofunctional non-ionic (meth)acrylate monomer, b) a vinyl aromatic monomer, c) an hydroxyl-containing (meth) acrylate monomer, d) a mixture of acid monomers with one first being a carboxylic or dicarboxylic acid monomer and a second one being a P-based or S-based acid monomer, e) a chain transfer agent, and optionally f) an internal crosslinker, with said the polymer having a Tg of −30 to 0° C., preferably from −20 to 0° C.

The second subject matter of the invention relates to a specific process for preparation of said aqueous dispersion of the invention.

Another subject matter of the invention relates to a coating composition comprising at least one aqueous dispersion as defined according to the present invention.

It is also covered by the present invention the use of the aqueous dispersion of the present invention in water-proofing bicomponent cementitious coating compositions.

Finally the present invention relates also to a final product which is a water-proof coating issued from the use of an aqueous dispersion of the invention.

DETAILED DESCRIPTION OF THE INVENTION

The present invention firstly relates to an aqueous polymer dispersion with said polymer comprising polymerized units issued from the monomers of the following monomeric composition comprising in weight proportions per 100 parts of monomers a)+b) as defined below:
a) 50 to 90%, preferably from 60 to 80% of at least one monoethylenically unsaturated non-ionic monomer having a homopolymer with a Tg (as measured by DSC at 10° C./min) lower than 0° C., preferably lower than −20° C.,
preferably said monomer a) being selected in the group consisting of alkyl (meth)acrylates or vinylic monomers and their mixtures, more preferably in the group consisting of alkyl (meth)acrylates and even more preferably of alkyl acrylates,
b) 10 to 50%, preferably from 20 to 40% of at least one monomer having a homopolymer Tg higher than 80° C., preferably of at least 90° C., preferably said monomer selected from vinyl aromatic monomers, more preferably selected from styrene and styrene derivatives or from methyl methacrylate or mixtures thereof,
c) 1 to 5%, preferably from 1 to 4%, of at least one hydroxyl-containing (meth)acrylate, preferably at least one hydroxy alkyl (meth)acrylate monomer more preferably with said alkyl being in C2-C4,
d) 0.1 to 3%, preferably from 0.2 to 2%, of at least one acid monomer selected from:
either d1) at least one acid monomer selected from a monocarboxylic acid monomer, a dicarboxylic acid monomer and their mixtures,
or from d2) at least one acid monomer selected from phosphorous-based or sulfur-based strong acid monomers or/and their salts,
or from the mixtures of the above-defined d1) and d2),
e) 0.001 to 2%, preferably from 0.001 to 1.5%, more preferably 0.005 to 1%, of at least one chain transfer agent, and
f) 0 to 1%, preferably from 0 to 0.5%, of at least one internal crosslinker bearing at least two copolymerisable ethylenic unsaturations, preferably selected from multifunctional (meth)acrylates bearing at least two (meth)acrylic groups or from polyvinyl monomers,
the said polymer having a Tg, by DSC at 10° C./min, of from −30 to 0° C., preferably from −20 to 0° C., and a gel content of 0 to 60%, preferably from 0 to lower than 55% formed during the polymerization.

The gel content represents the amount of a dried film of the dispersion to test, which is insoluble in THF after stirring for at least 48 h at room temperature (23° C.)

Monomer a) can be selected from non-ionic (meth)acrylates or vinylic monomers fulfilling the Tg requirement for a).

More particularly monomer a) is selected from: C4-C10 alkyl (meth)acrylates, more preferably C4-C8 alkyl (meth)acrylates, even more preferably C4-C10 alkyl acrylates, and most preferably C4-C8 alkyl acrylates.

Examples of suitable (meth)acrylate monomers according to a) are ethyl acrylate, n-propyl acrylate, n-butyl-, sec-butyl- or i-butyl (meth)acrylate, t-butyl acrylate, n-hexyl (meth)acrylate, 2-ethyl hexyl (meth)acrylate, heptyl acrylate, octyl acrylate, nonyl acrylate, decyl acrylate and their mixtures, more preferably n-butyl acrylate and 2-ethyl hexyl acrylate and their mixtures Examples of suitable monomers b) may be selected from:
Vinyl aromatic monomers such as styrene, and styrene derivatives like alpha methyl styrene, vinyl toluenes (including o-, m- and p-isomers) and other substituted styrene derivatives with the aromatic ring bearing at least one C1-C2 substituent, or
from methyl methacrylate (MMA) and mixtures thereof (including mixtures of vinyl aromatic monomers with MMA and mixtures of vinyl aromatic monomers themselves).

More particularly said monomer b) can be a mixture of at least one vinyl aromatic monomer with methyl methacrylate (MMA).

Suitable monomer c) may be selected from: hydroxyalkyl (meth)acrylates with alkyl being in C2 to C4 and their combinations.

Concerning acid monomer d), it can firstly be an acid monomer according to d1) with suitable examples of d1) acid monomers being C3-C6 mono- or dicarboxylic acid monomers. Monocarboxylic acid monomers can be selected from (meth)acrylic acid, itaconic acid, ethyl acrylic acid, crotonic acid, vinyl acetic acid and their combinations. As dicarboxylic acid monomers d1) can be mentioned: fumaric acid, maleic anhydride, tetrahydrophthalic acid (cyclohexene dioic acid) and their combinations.

Acid monomer d) according to a second option can be an acid monomer d2) selected from the group consisting of phosphorous-based (P-based) or sulfur-based (S-based) acid monomers. For P-based and S-based acid monomers d2, suitable examples can be selected as follows:
for P-based acid monomers d2), they can be selected from the group consisting of phosphoalkyl or phosphoalkyl ether (meth)acrylates or phosphinoalkyl or phosphinoalkyl ether (meth)acrylates. Said monomers may be partial esters of phosphoric acid or of phosphonic acid with hydroxyalkyl (meth)acrylates or with mono hydroxylated polyether (meth)acrylates or with hydroxylated alkyl polyether (meth)acrylates. It can also be selected from the group consisting of phospho alkyl (meth)acrylamides, phosphoalkyl crotonates, phosphoalkyl maleates, phosphoalkyl fumarates, phosphodialkyl (meth)acrylates, phosphodialkyl crotonates, vinyl phosphates, (meth)allyl phosphate, and phosphate esters of polyether glycol (meth)acrylates, in particular phosphate esters of polypropylene glycol (meth)acrylates, preferably from phospho alky (meth)acrylamides, phosphate esters of polyether glycol (meth)acrylates.

for S-based acid monomers d2) from partial esters of sulfuric acid (sulfate acid esters) with hydroxyalkyl (meth)acrylates or with mono hydroxylated polyether (meth)acrylates or monohydroxylated alkyl polyether (meth)acrylates or partial ester of sulfonic acid (sulfonate acid esters) with the same (meth)acrylates as defined for sulfuric acid or from sodium 2-acrylamido-2-methyl propanesulfonate, sodium vinyl sulfonate, sodium methyl allylsulfonate, sodium allylsulfonate, sodium allyloxyhydroxysulfonate preferably from sodium 2-acrylamido-2-methyl propanesulfonate, sodium vinyl sulfonate.

More preferably the aqueous polymer dispersion of the invention is based on a monomeric composition where said monomer d) is a mixture of d1) and of d2) as defined above.

Concerning said chain transfer agent e) as examples of suitable compounds can be mentioned mercaptans, preferably mercaptans without ionic groups.

More particularly said transfer agent e) is a mercaptan agent selected from n- or tert-dodecyl mercaptan or isoalkyl esters of mercapto alkanoic acids in C2-C4, preferably from isoalkyl mercaptopropionates or from isoalkyl mercaptoacetates, more preferably with said isoalkyl bearing from 6 to 12 carbon atoms and even more preferably said transfer agent e) is 3-isooctyl mercaptopropionate.

More preferably said chain transfer agent e) is selected from isoalkyl 3-mercaptopropionates with isoalkyl bearing from 7 to 9 carbon atoms.

As suitable examples of crosslinking monomer f) (as polymer internal crosslinker) can be mentioned polyvinyl benzenes or multifunctional (meth)acrylic esters of polyols with a functionality in (meth)acrylic groups of at least two and preferably from 2 to 6 polyvinyl benzenes like divinyl or trivinyl benzene, polyallyl ethers of polyols with functionality of at least 2, allyl (meth)acrylate, vinyl acrylate, diallyl (meth)acrylate, diallyl phthalate, dicyclopentenyl oxyethyl methacrylate or from their mixtures.

The monomeric composition according to the present invention may further comprise other functional monomers and in particular monomers bearing an acetoacetoxy or diacetone group more particularly (meth)acrylate monomers bearing acetoacetoxy or diacetone group and more particularly at monomer content ranging from 0 to 3% w/w with respect to monomers a)+b). More preferably such additional functional monomers can be diacetone acrylamide or/and acetoacetoxy ethyl (meth)acrylate.

More preferably said crosslinking monomer f) is selected from: multifunctional (meth)acrylates which are full esters of polyols with a functionality higher than 2, preferably from 2 to 6 and even more preferably from 2 to 4 or from their mixtures.

More specifically in said aqueous polymer dispersion according to the present invention said polymerized units are issued from the following monomers of a monomeric composition in the following weight proportions per 100 parts of weight of a)+b) as defined below:
60 to 80% of said monomer a) selected from: n-butyl acrylate or 2-ethyl hexyl acrylate or their mixtures
20 to 40% of said monomer b) selected from styrene or methyl methacrylate or their mixtures
0.1 to 4% of said monomer c) selected from: hydroxy ethyl acrylate, hydroxy propyl acrylate or hydroxy butyl acrylate or their mixtures,
0.2 to 2% of said monomer d) being selected from d1) being acrylic or methacrylic acid or from d2) being acrylamide propane sulfonic acid or a mixture of d1) and of d2).
0.001 to 1% of isoalkyl 3-mercapto propionate said isoalkyl being in C7 to C9.

More particularly, said monomeric composition from which is issued the aqueous polymer dispersion of the present invention further comprises a surfactant (emulsifier) system g) which consists of the combination of
g1) at least one anionic surfactant selected from the group consisting of alkyl sulfates and alkyl ether sulfates with the alkyl ranging from C6 to C20, alkyl or alkyl ether sulfonates with the alkyl ranging from C6 to C20, alkyl phosphates or phosphinates with the alkyl ranging from C6 to C20, alkyl ether phosphates or phosphinates with the alkyl ranging from C6 to C20, C6-C20 alkyl benzenesulfonates, C4-C18 half esters or diesters of sulfosuccinate, diphenyl oxide disulfonate and their combinations, and
g2) at least one non-ionic surfactant selected from the group consisting of ethoxylated fatty alcohol (C10-C40), with an ethoxy unit number ranging from 2 to 100 preferably from 5 to 50 and ethoxy-propoxy copolymers (EO-PO copolymer) and their combinations,
preferably with a weight ratio $g_1/g_2$ ranging from 0.1/0.9 to 0.9/0.1 and preferably from 0.25/0.75 to 0.75/0.25 and a weight content of g) with respect to a)+b) ranging from 0.5 to 5% preferably from 0.8 to 4%.

As examples of suitable surfactants according to the definition of surfactant g1 can be mentioned the following ones:
for alkyl and alkyl ether sulfates with alkyl in C6 to C20: sodium, potassium or ammonium salts, with sodium salt being particularly preferred of decyl sulfate, lauryl sulfate (like Disponil® SLS) stearyl sulfate, fatty alcohol ether sulphate, with 30 EO (like Disponil® FES77), fatty alcohol ether sulfate with 2 EO sodium (like Disponil® FES 27), 012/14 fatty alcohol ether sulfate with 12EO (like Disponil® FES 993), fatty alcohol ether sulphate with 4 EO (like Disponil® FES 32);
for alkyl and alkyl ether sulfonates (including disulfonates) with alkyl in C6 to C20: sodium, potassium or ammonium salts, with sodium salt being particularly preferred of decyl sulfonate, lauryl sulfonate, stearyl sulfonate, aromatic alkyl and aromatic alkyl ether sulfonate with alkyl in C6 to C20: sodium dodecylbenzene sulfonate (like POLYSTEP® A-16-22 or Rhodacal® DS-4), Sodium Dodecyl Diphenyl Oxide Disulfonate (like Dowfax® 2A1);
nonionic emulsifiers (surfactants) include ethoxylated mono-, di-, and trialkylphenols with EO degree from 3 to 50 and alkyl in C1 to C12 and also ethoxylated fatty alcohols with EO degree from 3 to 80; fatty alcohol ethoxylate, with 30EO; C13-Oxo alcohol ethoxylaye with 40EO (like Emulan® TO 4070), 013-Oxo alcohol ethoxylaye with 20EO (like Emulan® TO 2080), primary cetyl/stearyl alcohol condensed with 80 moles of ethylene oxide(OE) like Empilan® KM80.

According to a preferred option, said monomeric composition further comprises j) at least one pH buffer, preferably selected from sodium bicarbonate or from sodium carbonate or from sodium hydroxide, more preferably sodium bicarbonate, and even more preferably at a weight content of from 0.05 to 0.5% preferably 0.03 to 0.25% with respect to a)+b).

The function of such a pH buffer is to control and maintain a pH during the polymerization step in a controlled range of from 4 to 11 and preferably from 5 to 10.

The aqueous dispersion of the present invention can be obtained by a standard emulsion polymerization process, with some specific characteristics as specified below.

So, another subject of the invention is an emulsion polymerization process for preparing said aqueous dispersion. It is a process for preparing the aqueous dispersion of the invention which is an emulsion polymerization process comprising a polymerization step with a controlled pH range during polymerization from 4 to 11 preferably from 5 to 10 by adding a buffer agent in or with the monomeric composition, preferably said buffer agent being sodium bicarbonate, sodium carbonate or sodium hydroxide, more preferably being sodium bicarbonate.

More specifically said process involves an emulsifier (surfactant) system which is present in the said monomeric composition, said emulsifier (surfactant) system consisting of a mixture of two surfactants g1 and g2 as follows:
- g1) at least one anionic surfactant selected from the group consisting of alkyl sulfates and alkyl ether sulfates with the alkyl ranging from C6 to C20, alkyl or alkyl ether sulfonates with the alkyl ranging from C6 to C20, alkyl phosphates or phosphinates with the alkyl ranging from C6 to C20, alkyl ether phosphates or phosphinates with the alkyl ranging from C6 to C20, and mixtures thereof;
- g2) at least one non-ionic surfactant selected from the group consisting of ethoxylated fatty alcohol (C10-C40), with an ethoxy unit number ranging from 2 to 100 preferably from 5 to 50 and ethoxy-propoxy copolymers (EO-PO copolymer) and their combinations, preferably with a weight ratio $g_1/g_2$ ranging from 0.1/0.9 to 0.9/0.1 and preferably from 0.25/0.75 to 0.75/0.25 and a weight content of g) with respect to a)+b) ranging from 0.1 to 5% preferably from 0.5 to 4%.

The emulsion polymerization is conducted using the conditions as specified below.

The monomeric composition a) to j) as a pre-emulsion is fed into a reactor with continuous addition of an initiator solution system with a polymerization temperature in the range of 70 to 95° C. A final step of post-polymerization of any residual monomers is conducted by the addition of a suitable red/ox initiator system.

Suitable initiator system may comprise as initiator ammonium persulfate, potassium persulfate or sodium persulfate in the range of 0.1 to 2% preferably from 0.2 to 1% by weight with respect to the total of monomers fed.

As suitable redo/ox initiator system for the post-polymerization of residual monomers can be used as oxidant one of tert-butyl hydroperoxide in the range of 0.05 to 0.5%, preferably 0.05 to 0.25% by weight with respect to the total of monomers, and as reductant can be one of ascorbic acid, sodium metabisulfite, ferrous sulfate heptahydrate, sodium ascorbate, sodium bisulfite and Bruggolite® FF6M which is a mixture of Disodium salts of 2-Hydroxy-2-sulfinatoacetic acid and 2-Hydroxy-2-sufonatoacetic acid at 70% and sodium sulfite at 30%.

Another subject of the present invention relates to a coating composition, which comprises at least one aqueous polymer dispersion as defined above according to the present invention or as obtained by the process defined above. More particularly said coating composition is a two component water-proofing cementitious coating composition further comprising in addition to said aqueous polymer dispersion, a cement powder.

In addition to said dispersion and said cement powder, said coating composition can further comprise fillers, preferably selected from calcium carbonate (for example calcium carbonate 325 mesh), sand and their mixtures. As example of cement powder can be used Portland Cement P. 0 42.5 (from Anhui Conch Cement Co., Ltd. China) and as sand can be used Quartz sand (70-140 mesh).

A typical formulation of cementitious waterproofing coating composition (for 100 parts by weight of cement) is shown below in the following Table 1.

TABLE 1

A typical waterproof coating formulation

| JS II | | | Weight parts |
|---|---|---|---|
| Powder part | | | |
| cement | Portland Cement P. 0 42.5 (from Anhui Conch Cement Co., Ltd., China) | | 100 |
| sand | Quartz sand (70-140 mesh) | | 70 |
| Ca carbonate | Calcium carbonate 325mesh | | 80 |
| additive | Water Reducer F10 | Water Reducer | 0-0.5 |
| Liquid part | | | |
| emulsion | Aqueous dispersion | dispersion | 121.3 |
| water | Deionized water | | 17 |
| additive | Foamaster NXZ | defoamer | 0.6 |
| Total | | | 389.4 |

Another subject covered by the present invention relates to the use of said dispersion according to the present invention in waterproofing bicomponent cementitious coating compositions. More particularly said use is for low-odor water-proofing coatings with less than 50 ppm, preferably not more than 35 ppm of free ammonia, and having an elongation of at least 75%, preferably at least 125%, a tensile strength of at least 1.3 MPa, preferably of at least 2 MPa and a bonding strength of at least 0.7 MPa, preferably of at least 0.9 MPa. Finally the present invention relates to a final product which is a waterproof cementitious coating, which results from the use of at least one aqueous polymer dispersion as defined above according to the present invention or as obtained by the process as defined above according to the present invention or from the use of the coating composition as defined above according to the present invention.

More preferably said waterproof coating according to the present invention, is a water-proofing cementitious coating having low odor with less than 50 ppm, preferably not more than 35 ppm of free ammonia, having an elongation of at least 75%, preferably of at least 125%, a tensile strength of at least 1.3 MPa preferably of at least 2 MPa and a bonding strength of at least 0.7 MPa preferably of at least 0.9 MPa The general procedure to make water-proofing coating is as below.

The liquid components and the powder components are mixed according to the formulation as shown in Table 1 of formulation. They are stirred for ~5 minutes. The resulted formulation is then applied onto a polytetrafluoroethylene or silicon based panel by a blade coater to obtain a cementitious waterproofing film with a thickness of 2 mm. The film is hardened for 4 days under standard climate condition (23° C., 50% relative humidity), and followed by 2 days in 40°

C. oven. Tests of film properties are carried out after cooling the film in a desiccator to the room temperature.

The properties can meet GB 23445-2009 and the key items, e.g. elongation, tensile strength, etc in general give better result than GB 23445-2009. Comparing conventional product, the present invention has greatly reduced free ammonia level. It is obvious that the present invention meet JC 1066-2008 standard, and it is considered as no free-ammonia or ultra-low free-ammonia according to industrial practice with an improved balance of performances. The advantage of high properties and people-friendly is obtained.

The latex product (aqueous dispersion) of the invention is also suitable for JS I and JS III cementitous water-proofing formulation.

The following examples are given for illustrating the present invention and its performances and in this context they do not limit at all its covering.

EXAMPLES

Example 1

Into a three-liter, jacketed glass reactor equipped with stirrer (type of dual impellers), reflux condensers, and stainless steel or PTFE feed lines, was prepared. Initial charge was added to reactor. The reactor was then heated to 90° C. Monomer feed and oxidant feed were prepared in advance for a stable pre-emulsion and fine solution respectively (see Table 2 below).

When required temperature was reached and stable, monomer feed and oxidant feed was fed to reactor. The feeding lasted over 3 hours with proper stirring. After feeding, the reaction was post held for 1 hour at 90° C.

Then the reactor was cooled to below 80° C., redox reaction was introduced to post-treatment of reaction (vs residual monomers), by feeding post oxidant (solution of tert-butyl hydroperoxide 70% 1 g and water 9 g) and post reductant (solution of Bruggolite FF6M and 0.9 g and water 9 g). It was fed, and lasted for 1 hour.

The pH of the resulting latex was adjusted to approximately 6.5 to 8 with 25% sodium hydroxide. Finally, defoamer (Drewplus T-4201 0.8 g) and fungicide (Kathon® Lx 1400 0.4 g) were added slowly and respectively in the aqueous dispersion.

TABLE 2

| Composition used for Example 1 | | Quantity (g) | % by weight of a) to g) vs a) + b) |
|---|---|---|---|
| Initial Charge | Demineralized water | 211.4 | |
| | Seed Latex E9700 (Encor® 9700 from Arkema) | 7.6 | 1.4 |
| | Sodium bicarbonate (pH buffer) | 0.0 | 0 |
| Monomer Feed | butyl acrylate (a) | 338.3 | 61.1 |
| | 2-Ethylhexyl acrylate (a) | 46.5 | 8.4 |
| | Styrene (b) | 169.1 | 30.5 |
| | 2-Hydroxyethyl acrylate (c) | 16.9 | 3.1 |
| | Acrylic acid (d1) | 8.5 | 1.5 |
| | Isooctyl 3-mercaptopropionate (e) | 0.1 | 0.0180 (180 ppm) |
| | C6-C20 alkyl sulfate and alkyl ether sulfate (g1) | 8.5 | 1.5 |

TABLE 2-continued

| Composition used for Example 1 | | Quantity (g) | % by weight of a) to g) vs a) + b) |
|---|---|---|---|
| | Fatty alcohol ethoxylate, C40, 13EO (g2) | 8.5 | 1.5 |
| | Demineralized water | 136.6 | |
| Oxidant Feed | Sodium Persulfate | 1.7 | 0.31 |
| | Demineralized water | 46.5 | |

Example 2

The emulsion polymer was made in the manner as disclosed in connection to the synthesis in Example 1, except that the chain transfer agent (Isooctyl 3-metcaptopropionate) had higher content (0.91% vs a)+b)) and hydroxyl ethyl methacrylate was used in place of hydroxyethyl acrylate (see Table 3 below).

TABLE 3

| Composition used for Example 2 | | Quantity(g) | % by weight of a) to g) vs a) + b) |
|---|---|---|---|
| Initial Charge | Demineralized water | 209.5 | |
| | Seed Latex E9700 | 6.8 | |
| Monomer Feed | butyl acrylate (a) | 335.1 | 61.1 |
| | 2-Ethylhexyl acrylate (a) | 46.1 | 8.4 |
| | Styrene (b) | 167.6 | 30.5 |
| | 2-Hydroxyethyl methacrylate (c) | 25.1 | 4.6 |
| | Acrylic acid (d1) | 4.2 | 0.77 |
| | Isooctyl 3-metcaptopropionate (e) | 5.0 | 0.91 |
| | C6-C20 alkyl sulfate and alkyl ether sulfate (g1) | 8.4 | 1.5 |
| | Alkyl ethylene oxide, C1-C40, 2EO-100EO (g2) | 9.2 | 1.7 |
| | Demineralized water | 135.3 | |
| Oxidant Feed | Sodium Persulfate | 1.7 | 0.31 |
| | Demineralized water | 46.1 | |

Example 3 (Comparative)

The emulsion polymer was made in the manner as disclosed in connection to the synthesis in Example 1, except that acrylic acid (d1) is absent (see Table 4 below).

TABLE 4

| Composition for Comparative Example 3 | | Quantity(g) | % by weight of a) to g) vs a) + b) |
|---|---|---|---|
| Initial Charge | Demineralized water | 255.5 | |
| | Seed Latex E9700 | 8.3 | |
| | Sodium bicarbonate (j) | 0.0 | |
| Monomer Feed | butyl acrylate (a) | 408.8 | 86.9 |
| | 2-Ethylhexyl acrylate (a) | 56.2 | 12.0 |

TABLE 4-continued

Composition for Comparative Example 3

|  |  | Quantity(g) | % by weight of a) to g) vs a) + b) |
|---|---|---|---|
|  | Styrene (b) | 0.0 | 0 |
|  | Methyl methacrylate (b) | 5.1 | 1.1 |
|  | 2-Hydroxyethyl acrylate (c) | 20.4 | 4.3 |
|  | Isooctyl 3-mercaptopropionate (e) | 2.0 | 0.361 (3610 ppm) |
|  | C6-C20 alkyl sulfate and alkyl ether sulfate (g1) | 10.2 | 1.84 |
|  | Fatty alcohol ethoxylate, C40, 13EO (g2) | 10.2 | 1.84 |
|  | Demineralized water | 165.0 |  |
| Oxidant Feed | Sodium Persulfate | 2.0 | 0.4254 (4254 ppm) |
|  | Demineralized water | 56.2 |  |

Example 4

The emulsion polymer was made in the manner as disclosed in connection to the synthesis in Example 1, except some part of buffer (NaHCO$_3$) solution was fed (with pH control during polymerization) and about 10% of styrene replaced by MMA (see below Table 5).

TABLE 5

Composition for Example 4

|  |  | Quantity(g) | % by weight of a) to g) vs a) + b) |
|---|---|---|---|
| Initial Charge | Demineralized water | 206.1 |  |
|  | Seed Latex E9700 | 7.4 |  |
|  | Sodium bicarbonate (j) | 0.4 | 0.072 |
| Monomer Feed | butyl acrylate (a) | 371.1 | 67.2 |
|  | Styrene (b) | 164.9 | 29.8 |
|  | Methyl methacrylate (b) | 16.5 | 3.0 |
|  | 2-Hydroxyethyl acrylate | 16.5 | 3.0 |
|  | Methacrylic acid (d1) | 4.9 | 0.89 |
|  | Isooctyl 3-mercaptopropionate (e) | 0.2 | 0.0362 (362 ppm) |
|  | C10-C20 alkyl benzenesulfonate (g1) | 9.1 | 1.6 |
|  | Fatty alcohol ethylene oxide, 40EO (g2) | 11.5 | 2.1 |
|  | Demineralized water | 144.3 |  |
| Oxidant Feed | Sodium Persulfate | 1.6 | 0.29 |
|  | Demineralized water | 45.4 |  |

Example 5

The emulsion polymer was made in the manner as disclosed in connection to the synthesis in Example 1, except that a mixture of acid monomers d1+d2 was used instead of d1) (see Table 6 below).

TABLE 6

Composition for Example 5

|  |  | Quantity(g) | % by weight of a) to g) vs a) + b) |
|---|---|---|---|
| Initial Charge | Demineralized water | 210.4 |  |
|  | Seed Latex E9700 | 6.8 |  |
|  | Sodium bicarbonate (pH buffer j)) | 0.7 | 0.13 |
| Monomer Feed | butyl acrylate (a) | 336.6 | 60.6 |
|  | 2-Ethylhexyl acrylate (a) | 46.3 | 8.3 |
|  | styrene | 168.3 | 30.3 |
|  | Methyl methacrylate (b) | 4.2 | 0.76 |
|  | Sodium 2-Acrylamido-2 Methylpropanesulfonate (d2) | 4.2 | 0.76 |
|  | 2-Hydroxyethyl acrylate (c) | 16.8 | 3.0 |
|  | Acrylic acid (d1) | 4.2 | 0.76 |
|  | Isooctyl 3-mercaptopropionate (e) | 0.8 | 0.1440 (1440 ppm) |
|  | C6-C20 alkyl sulfate and alkyl ether sulfate (g1) | 8.4 | 1.5 |
|  | Fatty alcohol ethoxylate, C40, 13EO (g2) | 8.4 | 1.5 |
|  | Demineralized water | 135.9 |  |
| Oxidant Feed | Sodium Persulfate | 1.7 | 0.31 |
|  | Demineralized water | 46.3 |  |

Example 6 (Comparative Representative of Closest Prior Art)

The emulsion polymer was made in the manner as disclosed in connection to the synthesis in Example 1, except that the acrylamide used as functional monomer was added to the monomer mixture. Example 6 was used as the conventional product. Example 6 differs from Example 5 in the absence of e) (present in Example 5), absence of second acid monomer d2) (present in Example 5) and presence of acrylamide (absent in Example 5).

TABLE 7

Composition for Comparative Example 6

|  |  | Quantity(g) | % by weight of a) to g) vs a) + b) |
|---|---|---|---|
| Initial Charge | Demineralized water | 210.5 |  |
|  | Seed Latex E9700 | 6.8 |  |
|  | Sodium bicarbonate | 0.7 |  |
| Monomer Feed | butyl acrylate (a) | 336.9 | 61.1 |
|  | 2-Ethylhexyl acrylate (a) | 46.3 | 8.4 |
|  | Styrene (b) | 168.4 | 30.5 |
|  | Acrylamide | 12.6 | 2.3 |
|  | 2-Hydroxyethyl acrylate (c) | 8.4 | 1.5 |
|  | Acrylic acid (d1) | 8.4 | 1.5 |
|  | C6-C20 alkyl sulfate and alkyl ether sulfate (g1) | 8.4 | 1.5 |
|  | Fatty alcohol ethoxylate, C40, 13EO (g2) | 8.4 | 1.5 |
|  | Demineralized water | 136.0 |  |
| Oxidant Feed | Sodium Persulfate | 1.7 |  |
|  | Demineralized water | 46.3 |  |

Example 7 (Comparative)

It was prepared as in Example 1 but without mercaptan e) (see Table 8 below).

TABLE 8

Composition for Comparative Example 7

| | | g in a 1000 g scale | % by weight of a) to g) vs a) + b) |
|---|---|---|---|
| Initial Charge | Demineralized water | 211.4 | |
| | Seed Latex E9700 | 7.6 | 1.4% |
| | Sodium bicarbonate (j) | 0.0 | 0.0% |
| Monomer Feed | butyl acrylate (a) | 338.3 | 61.1 |
| | 2-Ethylhexyl acrylate (a) | 46.5 | 8.4 |
| | Styrene (b) | 169.1 | 30.5 |
| | Methyl methacrylate (b) | 0.0 | 0.0 |
| | Sodium 2-Acrylamido-2 Methylpropanesulfonate (d2) | 0.0 | 0.0 |
| | 2-Hydroxyethyl acrylate (c) | 16.9 | 3.1 |
| | Acrylic acid (d1) | 8.5 | 1.5 |
| | Isooctyl 3-mercaptopropionate (e) | 0.0 | 0.000 |
| | C6-C20 alkyl sulfate and alkyl ether sulfate (g1) | 8.5 | 1.5 |
| | Fatty alcohol ethoxylate, C13, 40EO (g2) | 8.5 | 1.5 |
| | Demineralized water | 136.6 | |
| Oxidant Feed | Sodium Persulfate | 1.7 | 0.3 |
| | Demineralized water | 46.5 | |
| Total of above | | 1000.0 | |
| Post Oxidant | tert-butyl hydroperoxide(70%) | 1.3 | |
| | Demineralized water | 8.5 | |
| Post reductant | Bruggolite FF6M | 1.3 | |
| | Demineralized water | 8.5 | |
| Dofoamer | Drewplus T-4201 | 0.8 | |
| Fungicide | Kathon Lx 1400 | 0.4 | |

Test methods used for tested performances

Tg: by DSC at 10° C./min after $2^{nd}$ passage.

Free ammonia: according to reference standard method JC1066-2008.

Gel content:
  Prepared dispersion (latex) film on PTFE plate, and dried in a dust-free environment.
  Film was completely dried, at least waited for 96 hours.
  Cut dried film in small pieces.
  Carefully placed into a stainless steel basket.
  Carefully placed the basket in THF, and let it being dissolved for at least 48 hours.
  Collected the basket with insoluble part, and let THF ventilate.
  Checked the weight and calculate gel content based on the formula:
    Gel content (%)=(C−A)/B×100%
    A: empty basket
    B: weight of film
    C: final weight of basket plus insoluble part Mechanical properties (tensile strength and elongation) and water tightness: China industrial standard GB/T23445-2009

Viscosity variation (workability): Brookfield viscosity variation on the waterproofing coating formulation.

Applicative Performances and Results

The following formulations as presented in Table 9 below were prepared based on the aqueous dispersions of Examples 1 to 7.

TABLE 9

Formulations tested

| JS II | Example 1 | Example 2 | Example 3 (comp.) | Example 4 | Example 5 | Example 6 (comp.) | Example 7 (comp.) |
|---|---|---|---|---|---|---|---|
| The liquid components | | | | | | | |
| Emulsion polymer (g) | 121.3 | 121.3 | 121.3 | 121.3 | 121.3 | 121.3 | 121.3 |
| Water (g) | 17 | 17 | 17 | 17 | 17 | 17 | 17 |
| Foamaster NXZ (g) | 0.6 | 0.6 | 0.6 | 0.6 | 0.6 | 0.6 | 0.6 |
| The powder components (g) | | | | | | | |
| cement (g) | 100 | 100 | 100 | 100 | 100 | 100 | 100 |
| Sand 70-140 (g) | 70 | 70 | 70 | 70 | 70 | 70 | 70 |
| CaCO$_3$ 325 (g) | 80 | 80 | 80 | 80 | 80 | 80 | 80 |
| Water Reducer F10 (g) | — | — | — | — | 0.5 | — | — |

The general procedure to make water-proofing cementitious coatings was as below. The liquid components and the powder components were mixed according to the formulation as shown in Table of formulation. They were stirred for ~5 minutes. The resulted formulation was then applied onto a polytetrafluoroethylene or silicon based panel by a blade coater to obtain a cementitious waterproofing film with a thickness of 2 mm. The film was hardened for 4 days under standard climate condition (23° C., 50% relative humidity), and followed by 2 days in 40° C. oven. Tests of film properties were carried out after cooling the film in a desiccator to the room temperature. The comparative results were shown in Table 10 below for mechanical performances including water tightness and for gel content in Table 10a.

TABLE 10

Comparative applicative performances of tested formulations

|  | Example 1 | Example 2 | Example 3 (comparative) | Example 4 | Example 5 | Example 6 (comparative) | Example 7 (comparative) |
| --- | --- | --- | --- | --- | --- | --- | --- |
| Elongation (%) | 80.95 | 125 | 258.15 | 144.77 | 133.73 | 122.04 | 57 |
| Tensile strength (Mpa) | 1.95 | 1.45 | 0.74 | 2.06 | 2.57 | 2.4 | 2.48 |
| Bonding strength (Mpa) | 0.86 | 1 | 0.3 | 1.05 | 1.02 | 0.96 | 0.95 |
| Water tightness (0.3 Mpa 3 min) | Pass | Pass | Fail | Pass | Pass | Pass | Pass |

Gel content (see in Table 10a below)

TABLE 10a

Gel content test results

|  | Example 1 | Example 2 | Example 3 (comp.) | Example 4 | Example 5 | Example 6 (comp.) | Example 7 (comp.) |
| --- | --- | --- | --- | --- | --- | --- | --- |
| Gel content | 42% | 5% | 0% | 30% | 12% | 72% | 66% |

The workability of the cementitious flexible waterproofing coatings for the tested formulations was shown in Table 11 below.

TABLE 11

The viscosity change (workability) of the tested formulations with the time

| Viscosity of the mixture (emulsion:cement = 121.3:100) mPa · s (cP) | Example 1 | Example 2 | Example 3 (comparative) | Example 4 | Example 5 | Example 6 (comparative) |
| --- | --- | --- | --- | --- | --- | --- |
| 0 min | 3200 | 1533 | 2107 | 2780 | 1420 | 7467 |
| 15 min | 3520 | 1950 | 2173 | 4107 | 2133 | 8583 |
| 30 min | 3753 | 2320 | 2213 | 4753 | 2287 | 9500 |
| 45 min | 3853 | 2460 | 2247 | 5040 | 2433 | 9900 |

Free ammonia test results are shown in Table 12 below.

TABLE 12

Comparative results on free-ammonia test

|  | Example 1 | Example 2 | Example 3 (comparative) | Example 4 | Example 5 | Example 6 (comparative) | Example 7 (comparative) |
| --- | --- | --- | --- | --- | --- | --- | --- |
| Free Ammonia (ppm) | 25 | 25 | 30 | 25 | 25 | 500 | 30 |

All these applicative results did confirm the improved performances of the formulations based on the aqueous dispersions of the present invention (Examples 1-2 and 4-5 and in particular Example 5 with mixed acid monomers d1)+d2) with respect to reference comparative formulations (based on Examples 3 and 6).

The invention claimed is:

1. A two-component water-proofing cementitious coating composition comprising an aqueous polymer dispersion and a cement powder, wherein the polymer of the aqueous polymer dispersion comprises polymerized units issued from the monomers of the following monomeric composition comprising in weight proportions per 100 parts of monomers a)+b) as defined below:
   a) 50 to 90% of at least one monoethylenically unsaturated non-ionic monomer having a homopolymer with a Tg (as measured by DSC at 10° C./min) lower than 0° C.,
   b) 10 to 50% of at least one monomer having a homopolymer Tg higher than 80° C.,
   c) 1 to 5% of at least one hydroxyl-containing (meth)acrylate,
   d) 0.1 to 3% of at least one acid monomer selected from:
      either d1) at least one acid monomer selected from a monocarboxylic acid monomer, a dicarboxylic acid monomer and their mixtures,
      or d2) at least one acid monomer selected from phosphorous-based or sulfur-based strong acid monomers or/and their salts,
      or from the mixtures of the above-defined d1) and d2),
   e) 0.001 to 2% of at least one chain transfer agent, and
   f) 0 to 1% of at least one internal crosslinker bearing at least two copolymerisable ethylenic unsaturations,
   the said polymer having a Tg by DSC at 10° C./min from −30 to 0° C., and a gel content of 0 to 60% formed during the polymerization.

2. The coating composition of claim 1, wherein monomer a) is selected from the group consisting of alkyl (meth)acrylates, vinylic monomers and mixtures thereof.

3. The coating composition of claim 1, wherein monomer a) is selected from alkyl (meth)acrylates with said alkyl being in C4 to C10.

4. The coating composition of claim 1, wherein monomer b) is selected from the group consisting of vinyl aromatic monomers, methyl methacrylate and mixtures thereof.

5. The coating composition of claim 4, wherein the vinyl aromatic monomers are selected from the group consisting of styrene, alpha methyl styrene, vinyl toluenes and other C1-C2 ring-substituted derivatives of styrene.

6. The coating composition of claim 1, wherein said monomer b) is a mixture of at least one vinyl aromatic monomer with methyl methacrylate.

7. The coating composition of claim 1, wherein said monomer c) is selected from: hydroxyl alkyl (meth)acrylates with said alkyl being in C2-C4.

8. The coating composition of claim 1, wherein said monomer d) is an acid monomer d1) selected from the group consisting of: acrylic or methacrylic acid, itaconic acid, tetrahydrophtahlic acid, fumaric acid, maleic anhydride.

9. The coating composition of claim 1, wherein monomer d) is an acid monomer d2) selected from the group consisting of P-based or S-based acid monomers.

10. The coating composition of claim 1, wherein said monomer d) is a mixture of d1) and of d2) as defined in one of claims 1, 6 and 7.

11. The coating composition of claim 1, wherein said transfer agent e) is selected from mercaptans.

12. The coating composition of claim 1, wherein said transfer agent is a mercaptan agent selected from n- or tert-dodecyl mercaptan or isoalkyl esters of mercapto alkanoic acids in C2-C4.

13. The coating composition of claim 1, wherein monomer f) is selected from: multifunctional (meth)acrylates which are full esters of polyols with a functionality higher than 2, polyvinyl benzenes, polyallyl ethers of polyols with functionality of at least 2, allyl (meth)acrylate, vinyl acrylate, diallyl (meth)acrylate, diallyl phthalate, dicyclopentenyl oxyethyl methacrylate or from their mixtures.

14. The coating composition of claim 1, wherein said polymerized units are issued from the following monomers of a monomeric composition in the following weight proportions per 100 parts of weight of a)+b) as defined below:
   60 to 80% of said monomer a) selected from the group consisting of n-butyl acrylate, 2-ethylhexyl acrylate and their mixtures,
   20 to 40% of said monomer b) selected from the group consisting of styrene, methyl methacrylate and their mixtures,
   0.1 to 4% of said monomer c) selected from the group consisting of hydroxyethyl acrylate, hydroxypropyl acrylate, hydroxy butyl acrylate and their mixtures,
   0.2 to 2% of said monomer d) being selected from the group consisting of d1) being acrylic or methacrylic acid, d2) being acrylamide propane sulfonic acid, and a mixture of d1) and d2),
   0.001 to 1% of isoalkyl 3-mercapto propionate, said isoalkyl being in C7 to C9.

15. The coating composition of claim 1, wherein the said monomeric composition further comprises as surfactant (emulsifier) system g) which consists of the combination of
   g1) at least one anionic surfactant selected from the group consisting of alkyl sulfates and alkyl ether sulfates with the alkyl ranging from C6 to C20, alkyl or alkyl ether sulfonates with the alkyl ranging from C6 to C20, alkyl phosphates or phosphinates with the alkyl ranging from C6 to C20, alkyl ether phosphates or phosphinates with the alkyl ranging from C6 to C20, C6-C20 alkyl benzenesulfonates, C4-C18 half esters or diesters of sulfosuccinate, diphenyl oxide disulfonate and their combinations, and
   g2) at least one non-ionic surfactant selected from the group consisting of ethoxylated fatty alcohol (C10-C40), with an ethoxy unit number ranging from 2 to 100 and ethoxy-propoxy copolymers (EO-PO copolymer) and their combinations,
   with a weight ratio $g_1/g_2$ ranging from 0.1/0.9 to 0.9/0.1 and a weight content of g) with respect to a)+b) ranging from 0.5 to 5%.

16. The coating composition of claim 1, wherein the said monomeric composition further comprises j) at least one pH buffer.

17. The coating composition of claim 1, wherein said coating composition further comprises fillers.

18. The coating composition of claim 1, wherein it is a low-odor water-proofing cementitious coating having low odor with less than 50 ppm of free ammonia, having an elongation of at least 75%, a tensile strength of at least 1.3 MPa and a bonding strength of at least 0.7 MPa.

* * * * *